(12) United States Patent
Hategan et al.

(10) Patent No.: US 9,071,939 B2
(45) Date of Patent: Jun. 30, 2015

(54) METHODS AND APPARATUSES FOR CONTEXT DETERMINATION

(75) Inventors: Andrea Hategan, Tampere (FI); Jussi Leppanen, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 69 days.

(21) Appl. No.: 13/825,670

(22) PCT Filed: Sep. 23, 2010

(86) PCT No.: PCT/IB2010/054300
§ 371 (c)(1),
(2), (4) Date: Mar. 22, 2013

(87) PCT Pub. No.: WO2012/038782
PCT Pub. Date: Mar. 29, 2012

(65) Prior Publication Data
US 2013/0184007 A1      Jul. 18, 2013

(51) Int. Cl.
*H04W 24/00* (2009.01)
*H04M 3/00* (2006.01)
*H04M 11/00* (2006.01)
*H04W 4/02* (2009.01)
*G06Q 30/02* (2012.01)
*G06Q 50/00* (2012.01)

(52) U.S. Cl.
CPC ........... *H04W 4/025* (2013.01); *G06Q 30/0259* (2013.01); *G06Q 50/01* (2013.01)

(58) Field of Classification Search
CPC ........ H04W 24/00; H04M 3/00; H04M 11/00
USPC ............................ 455/405, 418, 456.1, 456.3
See application file for complete search history.

(56) References Cited

U.S. PATENT DOCUMENTS

| | | | |
|---|---|---|---|
| 7,327,245 B2 * | 2/2008 | Krumm et al. ................. | 340/501 |
| 7,885,807 B2 * | 2/2011 | Bagnato et al. .................... | 704/4 |
| 2002/0111172 A1 | 8/2002 | DeWolf et al. | |
| 2004/0259536 A1 | 12/2004 | Keskar et al. | |
| 2009/0131080 A1 * | 5/2009 | Nadler et al. .............. | 455/456.3 |

(Continued)

FOREIGN PATENT DOCUMENTS

| | | |
|---|---|---|
| EP | 1 217 792 B1 | 6/2002 |
| WO | WO 2006/070240 A1 | 7/2006 |

(Continued)

OTHER PUBLICATIONS

International Search Report for Application No. PCT/IB2010/054300 dated May 18, 2011.

(Continued)

*Primary Examiner* — Inder Mehra
(74) *Attorney, Agent, or Firm* — Alston & Bird LLP

(57) ABSTRACT

Methods and apparatuses are provided for context determination. A method may include determining a location identifier. The location identifier may be indicative of a location of an apparatus. The method may further include determining a location cluster based at least in part on the location identifier. The method may additionally include determining a first probability for each of one or more contexts based at least in part on the determined location cluster. The method may also include determining a context of the apparatus based at least in part on the determined first probability. Corresponding apparatuses are also provided.

16 Claims, 7 Drawing Sheets

(56) References Cited

U.S. PATENT DOCUMENTS

| | | | |
|---|---|---|---|
| 2012/0013402 A1* | 1/2012 | Song et al. | 330/207 A |
| 2012/0093402 A1 | 4/2012 | Staelin et al. | |

FOREIGN PATENT DOCUMENTS

| | | |
|---|---|---|
| WO | WO 2008/052356 A1 | 5/2008 |
| WO | WO 2009/151925 A2 | 12/2009 |
| WO | WO 2011/110897 A1 | 9/2011 |
| WO | WO-2011/141761 A1 | 11/2011 |

OTHER PUBLICATIONS

Written Opinion from International Application No. PCT/IB2010/054300 dated May 18, 2011.

Yang, et al.; "Toward Physical Activity Diary: Motion Recognition Using Simple Acceleration Features with Mobile Phones" *The 1st International Workshop on Interactive Multimedia for Consumer Electronics (IMCE) at ACM Multimedia*; 2009; pp. 1-9.

Trevisani et al.; "Cell-ID Location Techniques, Limits and Benefits: An Experimental Study"; *Proceedings of the Sixth IEEE Workshop on Mobile Computing Systems and Applications*; 2004; pp. 51-60.

Silventoinen et al.; "Mobile Station Emergency Locating in GSM"; *Proceedings of the IEEE International Conference on Personal Wireless Communications*; 1996; pp. 232-238.

Baus et al.; "A Resource-Adaptive Mobile Navigation System"; *Proceedings of the 7th International Conference on Intelligent User Interfaces*; 2002; pp. 15-22.

Baus et al.; "A Survey of Map-Based Mobile Guides"; *Map-Based Mobile Services Theories, Methods and Implementations*; 2005; pp. 197-216.

Eronen et al.; "Audio-Based Context Recognition"; *IEEE Transaction on Audio Speech, and Language Processing*; vol. 14, No. 1; 2006; pp. 321-329.

Marmasse et al.; "A User-Centered Location Model"; *Personal and Ubiquitous Computing*; vol. 6; 2002; pp. 318-321.

Ashbrook et al.; "Learning Significant Locations and Predicting User Movement with GPS", *Proceedings of the 6th International Symposium on Wearable Computer*; 2002; pp. 101-108.

Ashbrook et al.; "Using GPS to Learn Significant Locations and Predicting Movement Across Multiple Users"; *Personal and Ubiquitous Computing*; vol. 7, No. 5; 2003; pp. 275-286.

Ester et al.; "A Density-Based Algorithm for Discovering Clusters in Large Spatial Databases with Noise"; *Proceedings of the International Conference on Knowledge Discovery and Data Mining*; 1996; pp. 226-231.

Zhou et al.; "Discovering Personally Meaningful Places: An Interactive Clustering Approach"; *ACM Transactions on Information Systems*; vol. 25; 2007; pp. 1-31.

Aipperspach et al.; "A Quantitative Method for Revealing and Comparing Places in the Home"; *Proceedings of the 8th International Conference on Ubiquitous Computing*; vol. 4206; 2006; pp. 1-18.

Laasonen et al.; "Adaptive on Device Location Recognition"; *Proceedings of the 2nd International Conference on Pervasive Computing*; 2004; pp. 287-304.

Hightower et al.; "Learning and Recognizing the Places Where We Go"; *Proceedings of the 7th International Conference on Ubiquitous Computing*; vol. 3660; 2005; pp. 159-176.

Meneses et al.; "Using GSM Cell-ID Positioning for Place Discovery"; *Proceedings of the 1st Workshop on Location Based Services for Health Care*; 2006; pp. 34-42.

Nurmi et al.; "Identifying Meaningful Locations"; *Proceedings of the 6th International Conference on Mobile and Ubiquitous Systems*; IEEE; 2006; pp. 1-8.

Rissanen et al.; "Modeling By the Shortest Data Description", *Automatica*; vol. 14; 1978; pp. 456-471.

Meeuwissen et al.; "Inferring and predicting context of mobile users"; *Bell Labs Technical Journal*; vol. 12, Issue 2; pp. 79-86.

Moreira et al.; "Enhancing a User Context by Real-Time Clustering Mobile Trajectories"; *Proceedings of the International Conference on Information Technology: Coding and Computing (ITCC '05)*; 2005; pp. 1-8.

Battestini, et al.; "Analysis and Cluster Based Modelling and Recognition of Context in a Mobile Environment"; *Proceedings of Modeling and Retrieval of Context*; 2005; pp. 85-96.

Papliatseyeu, et al.; "Mobile Habits: Inferring and Predicting User Activities with a Location-Aware Smartphone"; *3rd Symposium of Ubiquitous Computing and Ambient Intelligence; Advances in Soft Computing*; vol. 51; 2009; pp. 343-352.

Laasonen et al.; "Clustering and Prediction of Mobile User Routes from Cellular Data"; *Lecture Notes in Computer Science*; vol. 3721; 2005; pp. 569-576.

* cited by examiner

METHODS AND APPARATUSES FOR CONTEXT DETERMINATION

TECHNOLOGICAL FIELD

Embodiments of the present invention relate generally to context sensing technology and, more particularly, relate to methods and apparatuses for context determination.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used for execution of a wide range of applications.

The widespread adoption of mobile computing devices and expanding capabilities of the wireless networks over which they may communicate has further fueled expansion in the functionalities provided by mobile computing devices. In addition to providing telecommunications services, many mobile computing devices now provide functionalities such as navigation services, camera and video capturing capabilities, digital music and video playback, and web browsing. Some of the expanded functionalities and applications provided by modern mobile computing devices allow capture of user context information, which may be leveraged by applications to provide value-added context-based services to users. In this regard, mobile computing devices may implement applications that provide adaptive services responsive to a user's current context, such as an environmental context describing an environment in which the user is located or an activity context describing an activity in which the user is engaged.

BRIEF SUMMARY

Methods, apparatuses, and computer program products are herein provided for context determination. Methods, apparatuses, and computer program products in accordance with various embodiments may provide several advantages to computing devices, computing device users, application programmers, and service providers. Some example embodiments provide for prediction of a context based at least in part on historically observed context data. In this regard, some example embodiments utilize historically observed context data to determine a set of one or more location clusters comprising grouped location identifiers and related context labels corresponding to contexts observed at locations identified by the location identifiers. These location clusters may be used to predict a present context of an apparatus based at least in part on a present location of the apparatus. Some example embodiments utilize a predicted context to augment a sensed context determined based on sensory data. In this regard, some example embodiments may provide for more accurate context determination by combining a probability of a predicted context(s) and a probability of a sensed context(s) to determine a most likely context. Accordingly, applications and services may have access to context data determined with a greater degree of probability and users may be provided with context-based services that may more accurately reflect the user's present context.

In a first example embodiment, a method is provided, which comprises determining a location identifier. The location identifier of this example embodiment is indicative of a location of an apparatus. The method of this example embodiment further comprises determining a location cluster based at least in part on the location identifier. The method of this example embodiment additionally comprises determining a first probability for each of one or more contexts based at least in part on the determined location cluster. The method of this example embodiment also comprises determining a context of the apparatus based at least in part on the determined first probability.

In another example embodiment, an apparatus comprising at least one processor and at least one memory storing computer program code is provided. The at least one memory and stored computer program code are configured, with the at least one processor, to cause the apparatus of this example embodiment to at least determine a location identifier. The location identifier of this example embodiment is indicative of a location of an apparatus. The at least one memory and stored computer program code are configured, with the at least one processor, to further cause the apparatus of this example embodiment to determine a location cluster based at least in part on the location identifier. The at least one memory and stored computer program code are configured, with the at least one processor, to additionally cause the apparatus of this example embodiment to determine a first probability for each of one or more contexts based at least in part on the determined location cluster. The at least one memory and stored computer program code are configured, with the at least one processor, to also cause the apparatus of this example embodiment to determine a context of the apparatus based at least in part on the determined first probability.

In another example embodiment, a computer program product is provided. The computer program product of this example embodiment includes at least one computer-readable storage medium having computer-readable program instructions stored therein. The program instructions of this example embodiment comprise program instructions configured to determine a location identifier. The location identifier of this example embodiment is indicative of a location of an apparatus. The program instructions of this example embodiment further comprise program instructions configured to determine a location cluster based at least in part on the location identifier. The program instructions of this example embodiment also comprise program instructions configured to determine a first probability for each of one or more contexts based at least in part on the determined location cluster. The program instructions of this example embodiment additionally comprise program instructions configured to determine a context of the apparatus based at least in part on the determined first probability.

In another example embodiment, an apparatus is provided that comprises means for determining a location identifier. The location identifier of this example embodiment is indicative of a location of an apparatus. The apparatus of this example embodiment further comprises means for determining a location cluster based at least in part on the location identifier. The apparatus of this example embodiment additionally comprises means for determining a first probability for each of one or more contexts based at least in part on the determined location cluster. The apparatus of this example embodiment also comprises means for determining a context of the apparatus based at least in part on the determined first probability.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
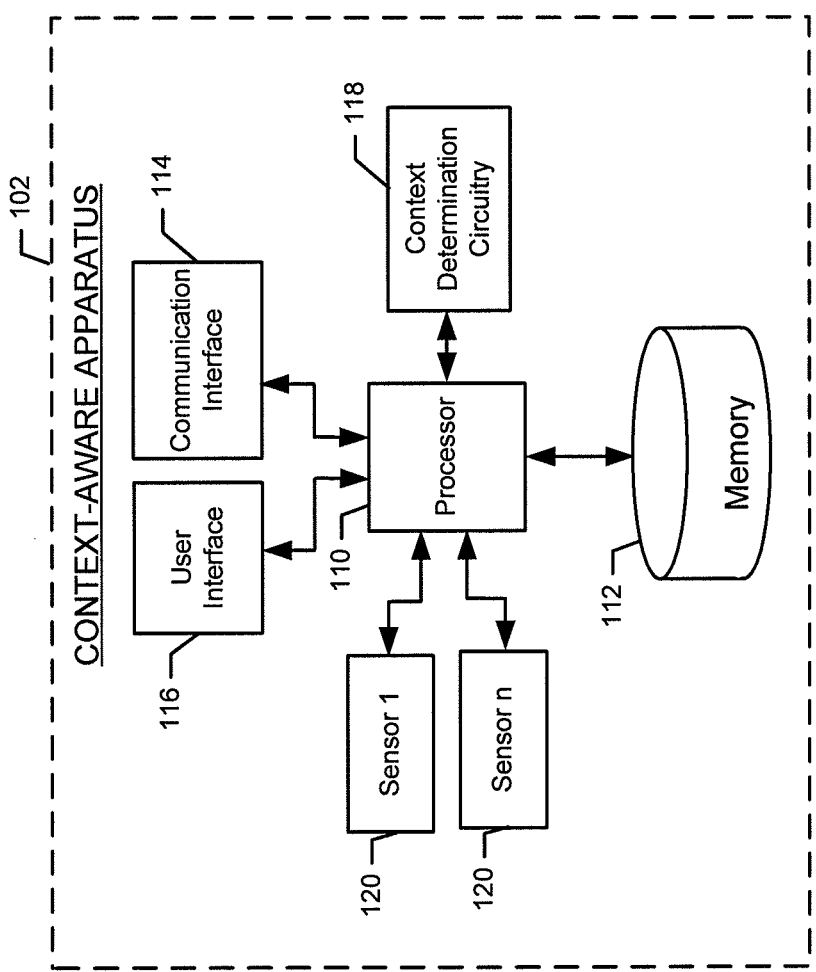
FIG. 1 illustrates a block diagram of a context-aware apparatus for context determination according to an example embodiment.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Some example embodiments disclosed herein below provide for context determination. In this regard, some example embodiments may predict context using location dependent context label distributions is presented. In some example embodiments, observed context information, such as environments a user visits and activities the user is performing in certain locations, may be collected. This collected historically observed context information may be used to combine locations having similar "context histories" together into "location clusters." In this regard, location clusters may comprise locations having a common likelihood of one or more contexts (e.g., environments, activities, and/or the like). For example, shops, restaurants, and streets are common environments in a city center, and running, walking, and cycling common activities in a recreational area As will be described further herein below with respect to some example embodiments, the distribution of context labels within a location cluster may be used to make context predictions. The context prediction may be used to enhance accuracy of context determination as compared to determination of a context based solely on sensory data. In this regard, for example, a probability of a predicted context(s) may be combined (e.g., summed) with a probability of a sensed context(s) to determine a context based on the combination of a predicted context and a sensed context. Thus, for example, if, based solely on environmental sensory data, it may not be determined to a satisfactory degree of probability whether the user is in the 'home' or 'office' environment (e.g., the probabilities are close to each other) a predicted context may be determined based on a current location to facilitate determination of whether 'home' or 'office' is more probable given the current location.

FIG. 1 illustrates a block diagram of a context-aware apparatus 102 for context determination according to an example embodiment. It will be appreciated that the context-aware apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of a context-aware apparatus for context determination, other configurations may also be used to implement embodiments of the present invention.

The context-aware apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, a headset, positioning device, chipset, a computing device comprising a chipset, any combination thereof, and/or the like. In an example embodiment, the context-aware apparatus 102 is embodied as a mobile terminal, such as that illustrated in FIG. 2.

Figure 2:
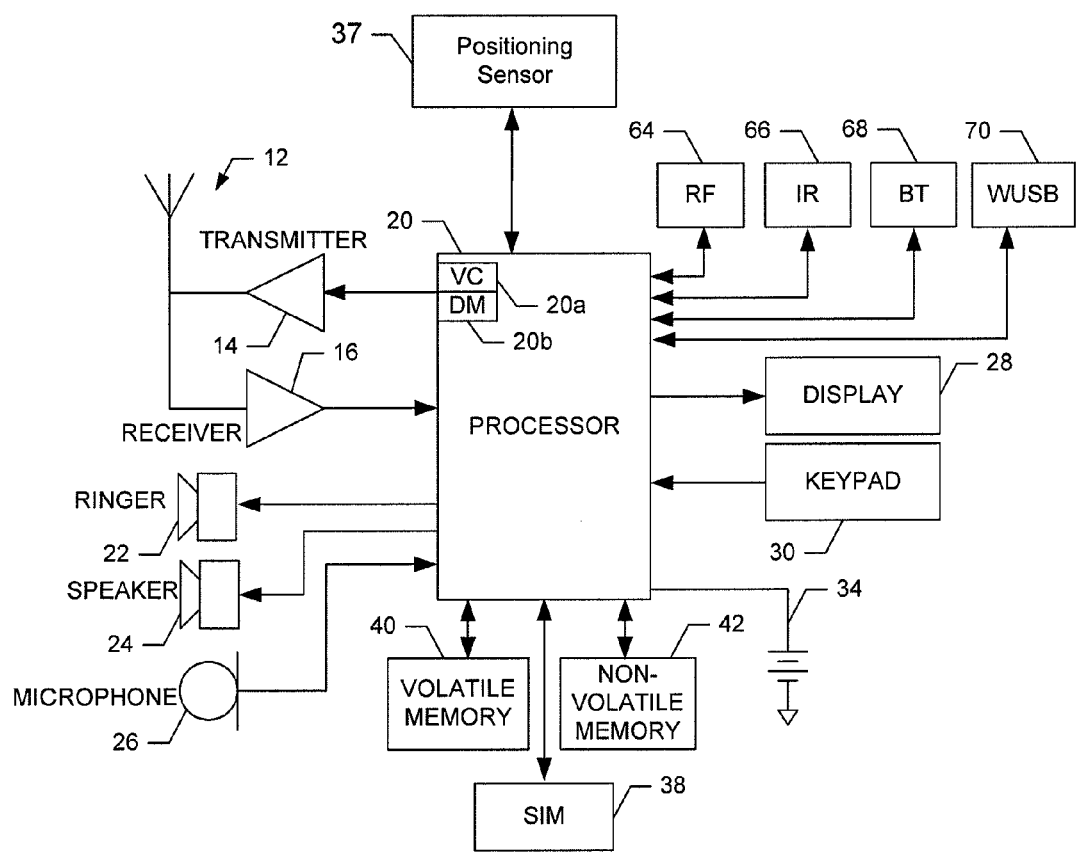
FIG. 2 is a schematic block diagram of a mobile terminal according to an example embodiment.

In this regard, FIG. 2 illustrates a block diagram of a mobile terminal 10 representative of one embodiment of a context-aware apparatus 102. It should be understood, however, that the mobile terminal 10 illustrated and hereinafter described is merely illustrative of one type of context-aware apparatus 102 that may implement and/or benefit from various embodiments of the invention and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may further include a positioning sensor 37. The positioning sensor 37 may include, for example, a global positioning system (GPS) sensor, an assisted global positioning system (Assisted-GPS) sensor, etc. In one embodiment, however, the positioning sensor 37 includes a pedometer, accelerometer, or inertial sensor. Further, the positioning sensor may determine the location of the mobile terminal 10 based upon signal triangulation or other mechanisms. The positioning sensor 37 may be configured to determine a location of the mobile terminal 10, such as latitude and longitude coordinates of the mobile terminal 10 or a position relative to a reference point such as a destination or a start point. Information from the positioning sensor 37 may be communicated to a memory of the mobile terminal 10 or to another memory device to be stored as a position history or location information. Furthermore, the memory of the mobile terminal 10 may store instructions for determining cell id information. In this regard, the memory may store an application program for execution by the processor 20, which may determine an identity of the current cell (e.g., cell id identity or cell id information) with which the mobile terminal 10 is in communication. In conjunction with the positioning sensor 37, the cell id information may be used to more accurately determine a location of the mobile terminal 10.

In an example embodiment, the positioning sensor 37 may comprise an accelerometer, inertial sensor, and/or pedometer, which may be used to determine a state of motion, a trajectory of motion, severity of motion, and/or the like of the mobile terminal 10. In embodiments where the positioning sensor comprises a GPS sensor or the like, a state of motion, trajectory of motion, and/or the like of the mobile terminal 10 may also be determined. In this regard, the positioning sensor may be configured to determine whether the mobile terminal 10 is in motion based upon whether the location of the mobile terminal 10 is changing over an interval 10. In some example embodiments, the positioning sensor 37 may be configured to determine a degree or severity of this state of motion based upon, for example, the distance traveled by the mobile terminal 10 over a time interval, an angle of a trajectory of motion of the mobile terminal 10, and/or the like.

Although not illustrated in FIG. 2, the mobile terminal 10 may include one or more physical sensors in addition to or in lieu of the positioning sensor 37. The physical sensors may, for example, comprise devices capable of sensing or determining specific physical parameters descriptive of the current context of the mobile terminal 10. For example, in some embodiments, the physical sensors may include respective different sensing devices for determining mobile terminal environmental-related parameters such as speed, acceleration, heading, orientation, inertial position relative to a starting point, location, proximity to other devices or objects, lighting conditions, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the context-aware apparatus 102 includes various means for performing the various functions herein described. These means may comprise one or more of a processor 110, memory 112, communication interface 114, user interface 116, context determination circuitry 118, or one or more sensors 120. The means of the context-aware apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the context-aware apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, context determination circuitry 118, and/or sensors 120 may be embodied as a chip or chip set. The context-aware apparatus 102 may therefore, in some example embodiments, be configured to implement embodiments of the present invention on a single chip or as a single "system on a chip." As another example, in some example embodiments, the context-aware apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the context-aware apparatus 102 as described herein. The plurality of processors may be embodied on a single computing device or distributed across a plurality of computing devices collectively configured to function as the context-aware apparatus 102. In embodiments wherein the context-aware apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the context-aware apparatus 102 to perform one or more of the functionalities of the context-aware apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the context-aware apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the context-aware apparatus 102 is embodied as a mobile terminal 10, the memory 112 may comprise the volatile memory 40 and/or the non-volatile memory 42. The memory 112 may be configured to store information, data, applications, instructions, or the like for enabling the context-aware apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may, for example, include historically observed context data, trained location clusters, and/or the like. This stored information may be stored and/or used by the context determination circuitry 118 and/or sensors 120 during the course of performing their functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device, such as over a network. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the context-aware apparatus 102 and one or more computing devices may be in communication. The communication interface 114 may additionally be in communication with the memory 112, user interface 116, context determination circuitry 118, and/or sensors 120, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive an indication of a touch gesture or other input to the touch screen display.

The user interface 116 may be in communication with the memory 112, communication interface 114, context determination circuitry 118, sensors 120, and/or positioning sensor 122, such as via a bus.

The context determination circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In embodiments wherein the context determination circuitry 118 is embodied separately from the processor 110, the context determination circuitry 118 may be in communication with the processor 110. The context determination circuitry 118 may further be in communication with one or more of the memory 112, communication interface 114, user interface 116, or sensors 120, such as via a bus.

In some embodiments, the context-apparatus 102 may comprise and/or be in operative communication with one or more sensors 120. In such embodiments, a sensor 120 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. The one or more sensors 120 may, for example, comprise one or more physical sensors, such as an accelerometer, a magnetometer, a proximity sensor, an ambient light sensor, a positioning sensor (e.g., the positioning sensor 37), an audio sensor, and/or any of a number of other possible sensors. The one or more sensors 120 may additionally or alternatively comprise one or more virtual sensors. Virtual sensors may include sensors that do not measure physical parameters. Thus, for example, virtual sensors may monitor such virtual parameters as RF (radio frequency) activity, time, calendar events, device state information, proximity to other computing devices, identities of proximate computing devices, active profiles, alarms, battery state, application data, data from web services, certain location information that is measured based on timing (for example, global positioning system (GPS) position) or other non-physical parameters (for example, cell-ID), and/or the like. As such, a sensor 120 may comprise any sensor configured to capture sensory data that may be used by the context determination circuitry 118 to determine a context (e.g., an environment context, activity context, and/or the like) of the context-aware apparatus 102.

In some example embodiments, the context determination circuitry 118 is configured to collect historical context data for the context-aware apparatus 102. The historical context data for the context-aware apparatus 102 may describe one or more historically observed contexts for the context-aware apparatus 102 and/or a user thereof. Respective unique observed contexts may be labeled with context labels. In this regard, a context label may correspond to an environmental context, activity context, or the like. The context label may comprise a textual label or may comprise a code representative of a context. These context labels may, for example, be at least in part automatically determined by the context determination circuitry 118, such as based on the outputs of one or more sensors 120. Additionally or alternatively, the context labels may be obtained from a user of the context-aware apparatus 102. In this regard, a user may enter his or her context at various times, in response to a prompt, and/or the like. The context determination circuitry 118 may map an entered context to the outputs of one or more sensors 120.

In some example embodiments, the context determination circuitry 118 may collect historical context data comprising pairs of time stamped location identifiers and corresponding context label(s) observed at respective locations identified by the location identifiers at the respective stamped times. Accordingly, the collected historical context data may comprise a sequence of location identifiers stamped with times at which the context-aware apparatus 102 was located at respective locations identified by the location identifiers and paired with respective context label(s) observed at the locations at the stamped times. The location identifiers may comprise cell identifiers (cell IDs), network access point identifiers (e.g., wireless local area network access point identifiers, and/or the like), router internet protocol addresses, a device identifier (e.g., an identity of a device detected as proximate to the context-aware apparatus, such as a Bluetooth device identifier, and/or the like), positioning data (e.g., GPS location data, latitude/longitude values, and/or the like). The table below illustrates possible context data collected for identifiers 123, 456, and 789, regarding context labels a, b, and c.

| Identifier | Context Label |
|---|---|
| 123 | b |
| 123 | c |
| 789 | a |
| 456 | b |
| 798 | a |

Furthermore, the collected historical context data may be further arranged into one or more histograms, each corresponding to a single identifier, and representing the empirical context label distributions. Each histogram bin may furthermore correspond to a particular context label, and its value may indicate the number of times that the particular label was observed in the location corresponding to the identifier. The table below shows an example of the histograms that may be collected from the context data above:

| Identifier | Context Label | | |
| | a | b | c |
|---|---|---|---|
| 123 | 0 | 1 | 1 |
| 456 | 0 | 1 | 0 |
| 789 | 2 | 0 | 0 |

The histograms may further be normalized by dividing with the sum of counts, such that the sum of values of each histogram will be one. The normalized histogram values indicate the probabilities of the device being in each of the known contexts a, b, c, when the location identifier is known.

In some embodiments, the context data observation may comprise a probability. For example, the context data observation may comprise a probability in embodiments wherein context observations are performed using a context sensing algorithm operating on one or more sensors of the device. In this case, the context history may comprise identifiers, context labels, and probabilities. The table below illustrates possible context data collected for identifiers 123, 456, and 789, regarding contexts a, b, and c, in the case when probabilities are used:

| Identifier | Context | Label Probability |
| --- | --- | --- |
| 123 | b | 0.9 |
| 123 | c | 1.0 |
| 789 | a | 0.2 |
| 456 | b | 0.5 |
| 798 | a | 0.4 |

When probabilities are used, the context determination circuitry 118 may accumulate the probability across different observations, to construct summary probability distributions for the identifiers:

| | Context label | | |
| --- | --- | --- | --- |
| Identifier | a | b | c |
| 123 | 0 | 0.9 | 1.0 |
| 456 | 0 | 0.5 | 0 |
| 789 | 0.6 | 0 | 0 |

The histograms may again be normalized such that the sum of each histogram becomes one.

In embodiments wherein a location identifier comprises device identifier, the location identifiers may be time dependent. As an example, if a location identifier comprises a Bluetooth device identifier, the Bluetooth device identifier may correspond to a plurality of unique location identifiers each having a corresponding period of time. For example, the Bluetooth device identifier XYZ may correspond to unique location identifiers XYZ1, XYZ2 . . . XYZ6, each of which may correspond to a period of four hours. In this regard, a device identifier does not indicate a physical location, but rather a relative position. Thus, if the context-aware apparatus 102 is proximate to device XYZ at noon, the environment context may be "lunch." If the context-aware apparatus 102 is proximate to device XYZ in the morning or afternoon, the environment context is more probably "office" or "meeting." If the context-aware apparatus 102 is proximate to device XYZ n the evening, the environment context may be a "pub." Accordingly, a device identifier may be accorded a plurality of time slots, each of which may be assigned a unique location identifier to account for time varying contexts.

In embodiments wherein a location identifier comprises positioning data, the location identifier may comprise an index, to a group of positioning coordinates. In this regard, a group of adjacent coordinates may be grouped together and referenced by an index. Accordingly, a position may be referenced by an index referencing a group of coordinates in which the position is located. In some embodiments, identifiers, such as cell IDs, which may be available without requiring additional power and/or computational overhead to determine, may be used by default for location identifiers when available.

The context determination circuitry 118 may be configured to implement a clustering algorithm for location cluster training. In this regard, the context determination circuitry 118 may be configured to form one or more location clusters by using historically observed context data as training data. The formed location clusters may each respectively comprise one or more location identifiers grouped based at least in part on historically observed contexts. Additionally or alternatively, the formed location clusters may each comprise a histogram comprising histogram values that may, for example, represent the summed counts for each context label observed in any of the locations corresponding to the grouped identifiers.

In some example embodiments, the context determination circuitry 118 may be configured to implement a clustering algorithm beginning with a number of location clusters equivalent to the number of unique location identifiers in the training data. The context determination circuitry 118 may be configured to perform a series of location cluster merger operations. Each merger operation may comprise determining a distance between current location clusters and merging those location clusters calculated to have a distance that is less than a predefined threshold distance. The context determination circuitry may, for example, be configured to measure the distance between two clusters using weighted Kullback-Leibler divergence (K-L divergence), a Euclidean distance calculation, a Manhattan distance calculation, a Mahalanobis distance calculation, a correlation calculation, a cosine distance calculation, some combination thereof, and/or the like.

The context determination circuitry 118 may continue to merge location clusters until only a single location cluster is remaining. The context determination circuitry 118 may then select a number (e.g., an optimal number) of location clusters to be formed for use in context prediction. In this regard, in some example embodiments, a threshold number of location clusters may not be used. The context determination circuitry 118 may be configured to select the number based at least in part on the Minimum Description Length (MDL) principle, Bayesian Information Criterion (BIC), Maximum Mutual Information (MMI), Minimum Message Length, Akaike Information Criterion, a heuristic scoring scheme, some combination thereof, or the like. In this regard, the current number of clusters following each merger operation may be known. In addition, the system may store a data structure describing the allocation of each location identifier to the clusters resulting after each merger operation. The allocation data structure may for example comprise an index for each location identifier indicating the cluster to which the location identifier belongs. MDL or the like may accordingly be used to compute the criteria value corresponding to the current number of clusters. This criteria value is a measure of how well the current number of clusters and their associated context label distributions describe the training data. Thus, in the end when only one cluster is left, the criteria value may have been computed for all intermediary number of clusters. The context determination circuitry 118 may accordingly determine, based on the criteria values, which value is the optimum (min or max) value of the selected criteria. In embodiments wherein MDL is used, the context determination circuitry 118 may determine the minimum value. The context determination circuitry 118 may accordingly select the number of clusters that yields the optimum criteria value. Using the allocation data structure, the context determination circuitry 118 may construct each cluster by collecting the data from the probability distributions or histograms of each identifier belonging to that cluster.

The selected location clusters may provide the probabilities of the context-aware apparatus being at each of the contexts known by the system, such as "shop", "restaurant", or the like. Accordingly, given a location identifier indicating a location of the context-aware apparatus 102, the context determination circuitry 118 may determine the location cluster to which it belongs and use the determined location cluster to predict a context(s) (e.g., environment context, apparatus context, and/or the like) of the context-aware apparatus 102. As a location identifier (e.g., a cell ID) may cover several places (e.g. "shop", "cafe", "bus station", etc), the context determination circuitry 118 may factor in a sequence of the previous visited contexts to improve the prediction accuracy in a location cluster.

In some example embodiments, the context determination circuitry 118 may be configured to implement a clustering algorithm that may be seen as a probabilistic clustering method. In this regard, the context labels may be considered to be generated by a number of random variables, where each random variable represents one cluster. The context determination circuitry 118 may infer the number of random variables and the probability distribution associated with each of them.

A clustering algorithm in accordance with one example embodiment will now be provided for purposes of example. It will be appreciated, however, that the example clustering algorithm provided below is provided purely for purposes of example and not by way of limitation. As such, other clustering algorithms may be readily substituted for the example algorithm in accordance with some example embodiments. Such other examples might include various agglomerative or divisive clustering methods, k-means clustering, max/min clustering, or the like. As previously described, the context determination circuitry 118 may be configured to maintain and/or have access to historically observed context data comprising time stamped location identifiers augmented with context labels. Given an example embodiment wherein the location identifiers comprise cell IDs, n may be used to denote the number of unique cell-ids and by $x_i$, i=1:n the $i^{th}$ cell ID. It will be appreciated, however, that cell IDs are used for purposes of example in describing this example clustering algorithm and not by way of limitation. Accordingly, other types of location identifiers may be used in addition to or in lieu of cell IDs. The context determination circuitry 118 may collect the empirical distribution of the context labels for each unique cell ID. The number of times context label j occurs at cell ID i may be denoted by $n_{j|i}$. The number of times the cell ID i occurs in the whole data set may be denoted by $n_i$. The empirical label distribution collected for the $i^{th}$ cell-id may be given by $p_{j|i} = n_{j|i}/n_i$, where j=1:m and m is the number of distinct context labels. In the beginning, each cell ID may represent one location cluster, and the context determination circuitry 118 may merge those clusters that are within the predefined threshold distance, until only one location cluster is left. The context determination circuitry 118 may then select the number of location clusters, such as based on the MDL principle. As an example, the context determination circuitry 118 may calculate the distance between all possible pairs of cell IDs based at least in part on the weighted Kulback-Leibler divergence. In this regard, given two location clusters u and v, the Kulback-Leibler divergence between their probability distributions may be defined as:

$$KL(u \| v) = \sum_{j=1}^{m} p_{j|u} \log_2 \frac{p_{j|u}}{p_{j|v}} \qquad [1]$$

Because the Kulback-Leibler divergence is not symmetric, the context determination circuitry 118 may use the weighted sum to measure the distance between the two location clusters:

$$D(u, v) = \frac{n_u}{n} KL(u \| v) + \frac{n_v}{n} KL(v \| u) \qquad [2]$$

The label distributions of the location clusters that are within the predefined threshold distance may be merged to form a new location cluster, which may replace the merged location clusters. Let u and v be two location clusters that have to be merged and let t be the resulting location cluster. The label distribution of the resulting location cluster may be given by $p_{j|t} = n_{j|t}/n_t$, where $n_t = n_u + n_v$ and $n_{j|t} = n_{j|u} + n_{j|v}$. In the end, one location cluster containing the empirical distribution of the labels in the whole data set may remain.

Using the MDL principle, the context determination circuitry 118 may select the optimal number of location clusters, such as may yield the shortest average code length to encode the context labels in each location cluster and their associated distributions:

$$k^* = \underset{k}{\operatorname{argmin}} J(k) \qquad [3]$$

where J(k) is the criteria value when k location clusters are used and may be computed as follows:

$$J(k) = \sum_{i=1}^{k} \sum_{j=1}^{m} -n_{j|i} \log_2 p_{j|i} + \frac{m}{2} \sum_{i=1}^{k} \log_2(n_i + 1) \qquad [4]$$

In alternative embodiments, rather than merging location clusters based on a clustering algorithm as described above, the context determination circuitry 118 may be configured to cluster location identifiers having a common maximum probable context. In this regard, given a set of location clusters, the context determination circuitry 118 may determine the context label having the greatest probability for each location cluster in the set of location clusters. If the context label having the greatest probability in a first location cluster and the context label having the greatest probability in a second location cluster match, the context determination circuitry 118 may merge the first and second location clusters. In such alternative embodiments, the number of clusters may be equal to the number of distinct context labels.

The context determination circuitry 118 may be configured to use trained location clusters to determine a predicted context(s) for the context-aware apparatus 102. In this regard, the context determination circuitry 118 may determine a location identifier indicative of a location (e.g., a current location) of the context-aware apparatus 102. The context determination circuitry 118 may further determine a location cluster based at least in part on the determined location identifier. In this regard, the context determination circuitry 118 may determine the location cluster containing the determined location identifier. The context determination circuitry 118 may determine a probability for at least one context based on the determined location cluster. In this regard, the context determination circuitry 118 may determine a probability of a context based at least in part on a context label distribution within the determined location cluster. In some example embodiments, the context determination circuitry 118 may determine a probability of a context further based on a time (e.g., the current time), a sequence of one or more previously observed contexts, and/or the like.

In some example embodiments, the context determination circuitry 118 may be configured to determine a context of the context-aware apparatus 102 at least in part by determining a predicted context label having the greatest probability as determined based on the determined location cluster. In some embodiments, the context determination circuitry 118 may be configured to determine a context of the context-aware apparatus 102 further based on sensory data. In this regard, the context determination circuitry 118 may determine sensory data collected by one or more sensors 120. The context determination circuitry 118 may determine a probability for one or more contexts based at least in part on the sensory data. The context determination circuitry 118 may combine the predicted probability of a context determined based on a location cluster and a probability of a context determined based on the sensory data. Accordingly, the context determination circuitry 118 may determine a combined probability for at least one context and determine a context having the greatest combined probability.

In an example embodiment, the context determination circuitry 118 may determine a context based on a combined probability using both sensory data and predicted context as follows. The context determination circuitry 118 may apply one or more classifiers to sensory data. For example, the context determination circuitry 118 may use an audio-based environment classifier to determine a probability $p_{j|s(1)}$ for context j. Another sensor s(2) (e.g., a sensor 120) may produce a probability $p_{j|s(2)}$ for context j. As an example, there may be S sensors. When performing context recognition at a location identified by location identifier t, the context determination circuitry 118 may determine a predicted probability $p_{j|t}$ for context j. The context determination circuitry 118 may combine the sensor-based context classifications and the predicted context as follows:

$$p_{j|total} = W_s \frac{1}{S} \sum_{k=1}^{S} w(s(k)) \log(p_{j|s(k)}) + W_{pred} \log(p_{j|t}), \quad [5]$$

where w(s(k)) is a weight between 0 and 1 for sensor s(k), and $W_s$ and $W_{pred}$ are weights for the sensor-based probability and predicted probability, respectively. If any of the sensors return the logarithms of the probabilities or logarithmic likelihoods of the context labels, instead of probabilities, the likelihoods may be exponentiated and then normalized to obtain the context label probabilities. Moreover, in some embodiments, given the current location identifier t, the context determination circuitry 118 may discard the probabilities for the context labels that were not seen at all in the current location and then compute the new probabilities $p'_{j|s(1)}$. For example, if the audio based context predictor is confusing environments like home and office (e.g., because both environments might be quiet), by knowing that in the current location identifier home was never seen, the audio based predictor may be helped to make more accurate predictions.

In some embodiments, the weights $W_s$ and $W_{pred}$ may be class dependent, such that different sensors may receive different weights when computing the probabilities. In some embodiments, the weights may be computed dynamically for each sensor and/or for each predictor. As an example, the weights may be computed dynamically for each predictor by computing the probability difference between the two most probable context labels and then computing the weights by normalizing with the sum of all computed differences. Also, in some embodiments, the weights may reflect a score for the most probable context label, (e.g. the p-value) of each of the sensors and predictors. In some embodiments, instead of combining the probabilities, the system may employ another classifier, such as a support vector machine (SVM) or a neural network, to learn the mapping between sensor-based probabilities and predicted probabilities and system outputs. For example, in some example embodiments, the context determination circuitry 118 may construct a new feature vector by concatenating the sensor-based probabilities and predicted probabilities. This combined feature vector may then be classified with a classifier to yield the recognition result.

In embodiments wherein a mixture of types of location identifiers are used, the equation [5] used to combine the sensor-based context classifications and predicted context may be expanded to include a predicted context probability for each of a plurality of location identifier types. As an example wherein a context is predicted for a cell ID location identifier and a wireless local area network (WLAN) access point identifier, equation 5 may be include a predicted probability value of $p_{j|t}$ for a current cell ID and a predicted probability value of $p_{j|t}$ for a current WLAN access point identifier. Each predicted probability value $p_{j|t}$ may be weighted in the expanded equation by a respective $W_{pred}$ weight value.

Figure 3:
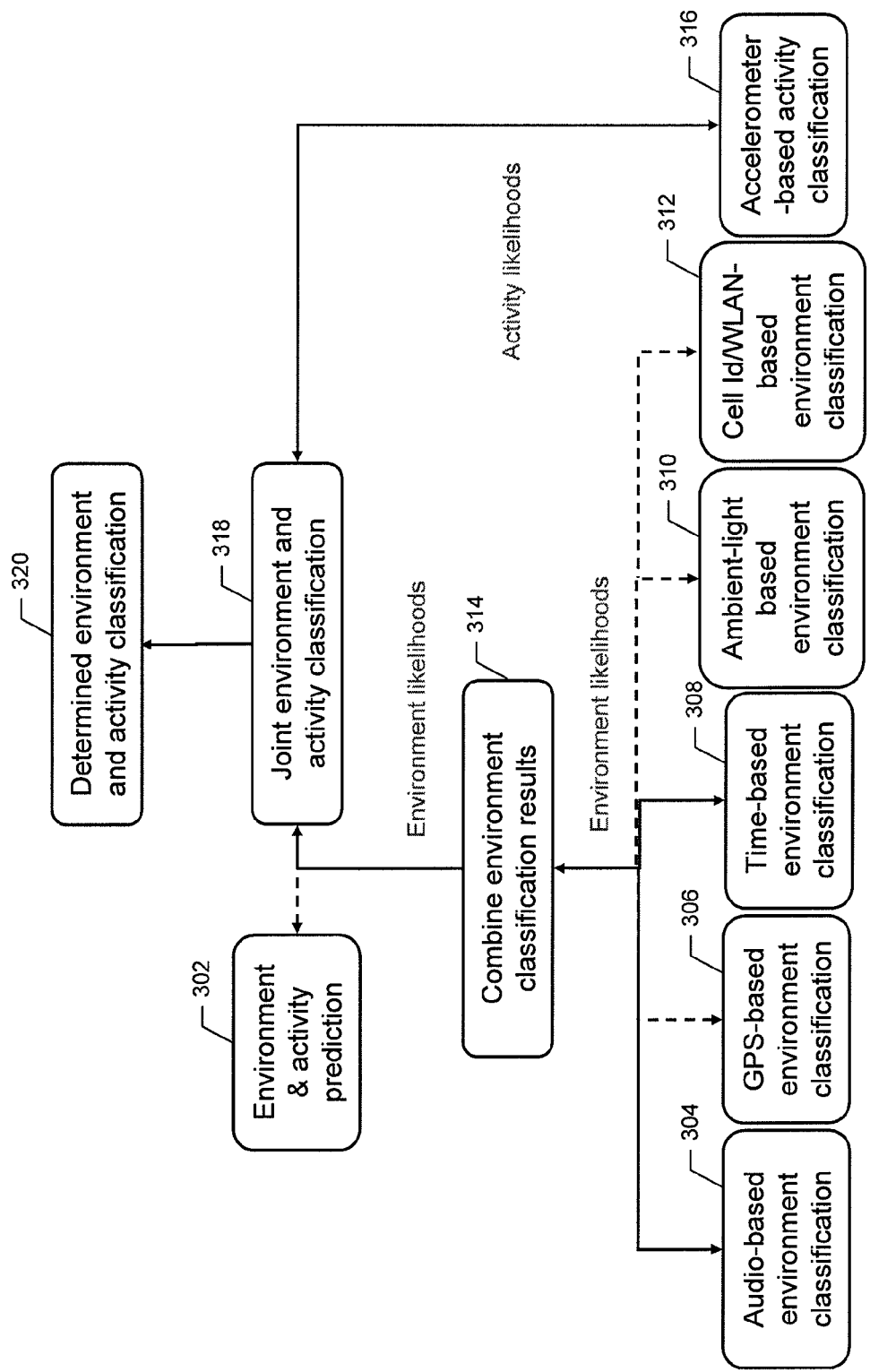
FIG. 3 illustrates context determination according to an example embodiment.

Referring now to FIG. 3, FIG. 3 illustrates an example of context determination according to an example embodiment. In this regard, the context determination circuitry 118 may determine a predicted environment context, predicted activity context, and/or the like, at operation 302. Operation 314 may comprise the context determination circuitry 118 combining environment context classification results determined from one or more environment sensors to determine an environment context based on sensory data. The environment sensors may comprise one or more of an audio-based environment classification sensor 304, location-based (e.g., GPS-based) environment classification sensor 306, time-based environment classification sensor 308, ambient-light based environment classification sensor 310, Cell ID/wireless local area network-based environment classification sensor 312, and/or the like. The context determination circuitry 118 may further determine an activity context based at least in part on an accelerometer-based activity classification sensor, at operation 316. Operation 318 may comprise the context determination circuitry 118 combining the contexts predicted in operation 302 with the sensory-based contexts determined in operations 314 and 316. The context determination circuitry 118 may determine an environment context and activity context, at operation 320, based on the results of the combination(s) performed in operation 318.

In some example embodiments, the context determination circuitry 118 may be configured to determine sensory-based context classification using fused sensor data and/or context data. In this regard, capture of sensor data may be distributed over a plurality of system levels and the captured sensory data may be fused at each of the plurality of system levels. This distributed capture and fusion may, for example, be performed according to any of the methods described in International Patent Application Number PCT/IB2010/001109, filed on May 13, 2010, the contents of which are incorporated herein by reference. As an example use of distributed collection and fusing of context data, in some example embodiments, the context predictions from the location clusters may be implemented as a virtual sensor. In some such example embodiments, the sensory context recognition and obtaining probabilities for contexts in each cell may be implemented on low levels of the system, such as on a dedicated sensor processor. The results may be communicated to the higher levels, and used to update the location clusters at higher levels, such as in the middleware layer.

The context determination circuitry 118 may be further configured to update a context label distribution in a location cluster by repeating clustering, such as in accordance with a clustering algorithm described above. In some example embodiments, the context determination circuitry 118 may perform re-clustering in response to determining a context of the context-aware apparatus 102. In some example embodiments, the context determination circuitry 118 may perform re-clustering periodically, such as once a day. As still a further example, the context determination circuitry 118 may perform re-clustering in an instance in which the trained location clusters fail to satisfy a predefined validity criterion.

Figure 4:
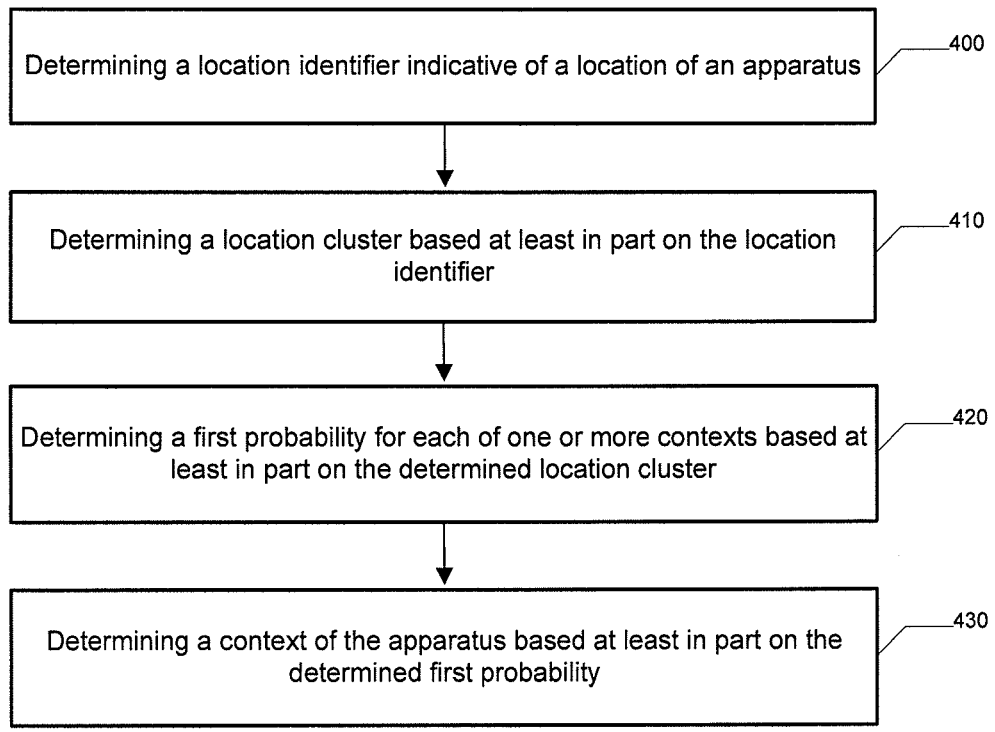
FIG. 4 illustrates a flowchart according to an example method for context determination according to an example embodiment.

FIG. 4 illustrates a flowchart according to an example method for context determination according to an example embodiment. The operations illustrated in and described with respect to FIG. 4 may, for example, be performed by, with the assistance of, and/or under the control of one or more of the processor 110, memory 112, communication interface 114, user interface 116, context determination circuitry 118, or sensors 120. Operation 400 may comprise determining a location identifier indicative of a location of the context-aware apparatus 102. The processor 110, memory 112, context determination circuitry 118, and/or sensors 120 may, for example, provide means for performing operation 400. Operation 410 may comprise determining a location cluster based at least in part on the location identifier. The processor 110, memory 112, and/or context determination circuitry 118 may, for example, provide means for performing operation 410. Operation 420 may comprise determining a first probability for each of one or more contexts based at least in part on the determined location cluster. The processor 110, memory 112, and/or context determination circuitry 118 may, for example, provide means for performing operation 420. Operation 430 may comprise determining a context of the context-aware apparatus 102 based at least in part on the determined first probability. The processor 110, memory 112, and/or context determination circuitry 118 may, for example, provide means for performing operation 430.

Figure 5:
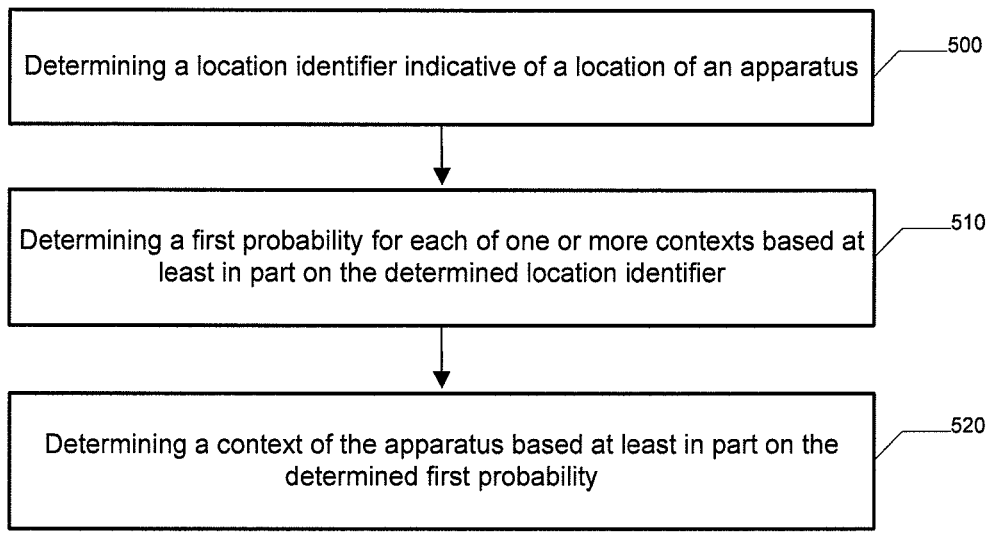
FIG. 5 illustrates a flowchart according to an example method for context determination according to an example embodiment.

FIG. 5 illustrates a flowchart according to an example method for context determination according to an example embodiment. The operations illustrated in and described with respect to FIG. 5 may, for example, be performed by, with the assistance of, and/or under the control of one or more of the processor 110, memory 112, communication interface 114, user interface 116, context determination circuitry 118, or sensors 120. Operation 500 may comprise determining a location identifier indicative of a location of the context-aware apparatus 102. The processor 110, memory 112, context determination circuitry 118, and/or sensors 120 may, for example, provide means for performing operation 500. Operation 510 may comprise determining a first probability for each of one or more contexts based at least in part on the determined location identifier. The processor 110, memory 112, and/or context determination circuitry 118 may, for example, provide means for performing operation 510. In this regard, in instances wherein there are as many clusters as unique location identifiers, determination of a cluster, as determined in operation 410 may not be needed as the determined location identifier may be coextensive with the corresponding cluster. As such, the determined location identifier may have its own probability distribution that may be used to determine a probability of a context. Operation 520 may comprise determining a context of the context-aware apparatus 102 based at least in part on the determined first probability. The processor 110, memory 112, and/or context determination circuitry 118 may, for example, provide means for performing operation 520.

Figure 6:
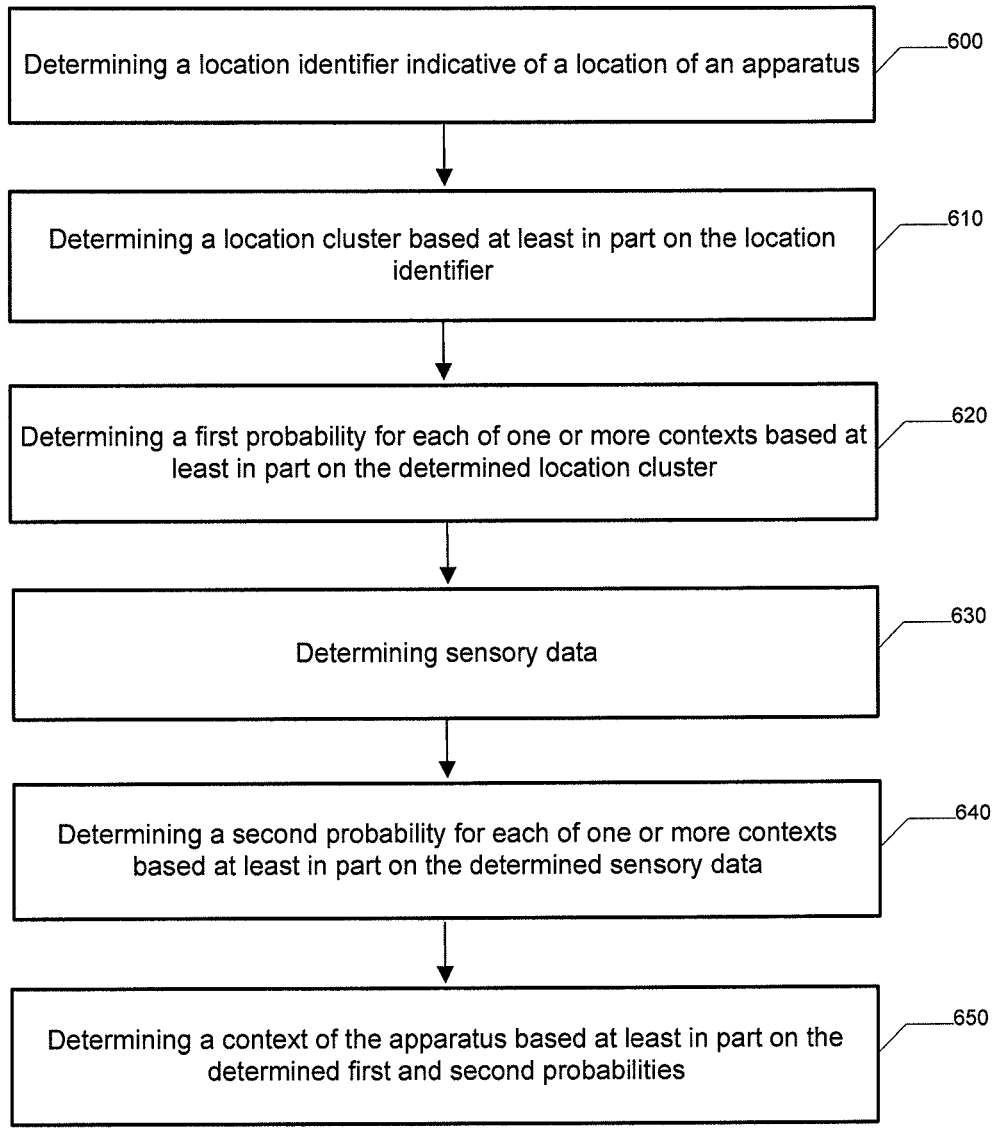
FIG. 6 illustrates a flowchart according to an example method for context determination according to an example embodiment.

FIG. 6 illustrates a flowchart according to an example method for context determination according to an example embodiment. The operations illustrated in and described with respect to FIG. 6 may, for example, be performed by, with the assistance of, and/or under the control of one or more of the processor 110, memory 112, communication interface 114, user interface 116, context determination circuitry 118, or sensors 120. Operation 600 may comprise determining a location identifier indicative of a location of the context-aware apparatus 102. The processor 110, memory 112, context determination circuitry 118, and/or sensors 120 may, for example, provide means for performing operation 600. Operation 610 may comprise determining a location cluster based at least in part on the location identifier. The processor 110, memory 112, and/or context determination circuitry 118 may, for example, provide means for performing operation 610. Operation 620 may comprise determining a first probability for each of one or more contexts based at least in part on the determined location cluster. The processor 110, memory 112, and/or context determination circuitry 118 may, for example, provide means for performing operation 620. Operation 630 may comprise determining sensory data. The processor 110, memory 112, context determination circuitry 118, and/or sensors 120 may, for example, provide means for performing operation 630. Operation 640 may comprise determining a second probability for each of one or more contexts based at least in part on the determined sensory data. The processor 110, memory 112, and/or context determination circuitry 118 may, for example, provide means for performing operation 640. Operation 650 may comprise determining a context of the context-aware apparatus 102 based at least in part on the determined first and second probabilities. The processor 110, memory 112, and/or context determination circuitry 118 may, for example, provide means for performing operation 650.

Figure 7:
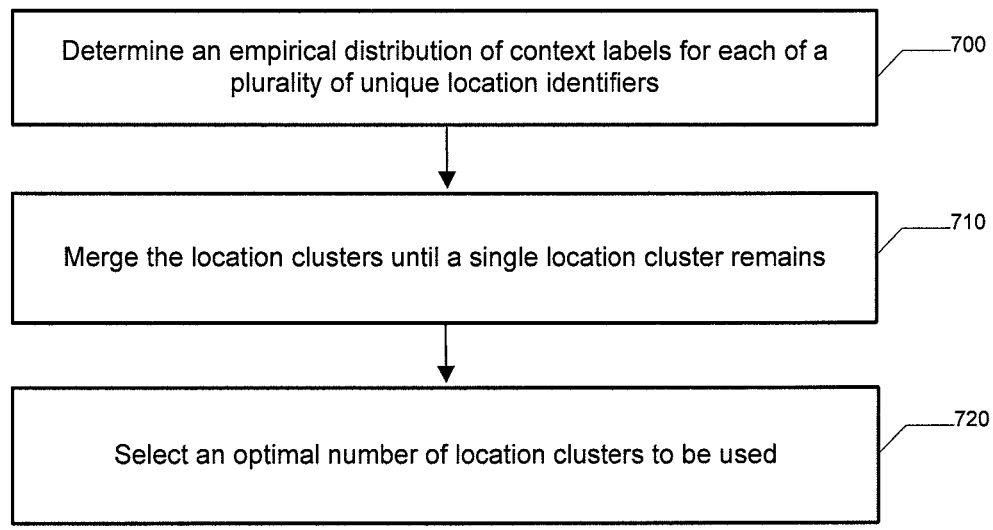
FIG. 7 illustrates a flowchart according to an example method for location cluster training according to an example embodiment.

FIG. 7 illustrates a flowchart according to an example method for location cluster training according to an example embodiment. The operations illustrated in and described with respect to FIG. 7 may, for example, be performed by, with the assistance of, and/or under the control of one or more of the processor 110, memory 112, communication interface 114, user interface 116, context determination circuitry 118, or sensors 120. Operation 700 may comprise determining an empirical distribution of context labels for each of a plurality of unique location identifiers. The processor 110, memory 112, communication interface 114, context determination circuitry 118, and/or sensors 120 may, for example, provide means for performing operation 700. Operation 710 may comprise merging the location clusters until a single location cluster remains. In this regard, each unique location identifier may be considered as a location cluster and the location clusters may be progressively merged until a single location cluster remains. The processor 110, memory 112, and/or context determination circuitry 118 may, for example, provide means for performing operation 710. Operation 720 may comprise selecting an optimal number of location clusters to be used (e.g., to be formed). The processor 110, memory 112, and/or context determination circuitry 118 may, for example, provide means for performing operation 720.

FIGS. 4-7 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a context-aware apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a context-aware apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining a location identifier, the location identifier being indicative of a location of an apparatus;
   determining a location cluster based at least in part on the location identifier, wherein the determined location cluster comprises a location cluster determined from a set of at least one location cluster, and wherein each location cluster in the set of at least one location cluster comprises a cluster of one or more location identifiers grouped based at least in part on historically observed context data comprising a plurality of location identifiers augmented with context labels corresponding to observed contexts of the apparatus;
   determining a first probability for one or more contexts based at least in part on the determined location identifier, wherein determining the first probability comprises determining the first probability for one or more contexts based at least in part on the determined location cluster; and
   determining a context of the apparatus based at least in part on the determined first probability.

2. The method of claim 1, further comprising:
   determining sensory data; and
   determining a second probability for one or more contexts based at least in part on the sensory data; and
   wherein determining a context of the apparatus comprises determining the context of the apparatus further based on the determined second probability.

3. The method of claim 2, wherein determining a context of the apparatus comprises:
   combining the first probability and the second probability for one or more contexts to determine a combined probability for the one or more contexts; and
   determining the context of the one or more contexts having the greatest combined probability.

4. The method of claim 1, wherein:
   determining a location cluster comprises determining a location cluster from the set of at least one location cluster that includes the determined location identifier; and
   determining a first probability for one or more contexts comprises determining a predicted probability for a context based at least in part on a distribution of context labels for the determined location cluster.

5. The method of claim 4, further comprising:
determining a distance between the determined location cluster and a second location cluster;
comparing the determined distance to a predefined threshold distance; and
merging the determined location cluster and the second location cluster in an instance in which the determined distance is less than the threshold distance.

6. The method of claim 4, further comprising:
determining a context label having a greatest probability for the determined location cluster;
comparing the determined context label to a context label having a greatest probability for a second location cluster; and
merging the determined location cluster and the second location cluster in an instance in which the determined context label and the context label having the greatest probability for the second location cluster match.

7. The method of claim 6, further comprising:
selecting a number of location clusters to be formed; and
forming the selected number of location clusters.

8. An apparatus comprising at least one processor and at least one memory storing computer program code, wherein the at least one memory and stored computer program code are configured, with the at least one processor, to cause the apparatus to at least:
determine a location identifier, the location identifier being indicative of a location of the apparatus;
determine a location cluster based at least in part on the location identifier, wherein the determined location cluster comprises a location cluster determined from a set of at least one location cluster, and wherein each location cluster in the set of at least one location cluster comprises a cluster of one or more location identifiers grouped based at least in part on historically observed context data comprising a plurality of location identifiers augmented with context labels corresponding to observed contexts of the apparatus;
determine a first probability for one or more contexts based at least in part on the determined location identifier and the determined location cluster; and
determine a context of the apparatus based at least in part on the determined first probability.

9. The apparatus of claim 8, wherein the at least one memory and stored computer program code are configured, with the at least one processor, to further cause the apparatus to:
determine sensory data; and
determine a second probability for one or more contexts based at least in part on the sensory data; and
wherein the at least one memory and stored computer program code are configured, with the at least one processor, to cause the apparatus to determine a context of the apparatus by determining the context of the apparatus further based on the determined second probability.

10. The apparatus of claim 9, wherein the at least one memory and stored computer program code are configured, with the at least one processor, to cause the apparatus to determining a context of the apparatus at least in part by:
combining the first probability and the second probability for one or more contexts to determine a combined probability for the one or more contexts; and
determining the context of the one or more contexts having the greatest combined probability.

11. The apparatus of claim 8, wherein the at least one memory and stored computer program code are configured, with the at least one processor, to cause the apparatus to:
determine a location cluster at least in part by determining a location cluster from the set of at least one location cluster that includes the determined location identifier; and
determine a first probability for one or more contexts at least in part by determining a predicted probability for a context based at least in part on a distribution of context labels for the determined location cluster.

12. The apparatus of claim 11, wherein the at least one memory and stored computer program code are configured, with the at least one processor, to further cause the apparatus to:
determine a distance between the determined location cluster and a second location cluster;
compare the determined distance to a predefined threshold distance; and
merge the determined location cluster and the second location cluster in an instance in which the determined distance is less than the threshold distance.

13. The apparatus of claim 11, wherein the at least one memory and stored computer program code are configured, with the at least one processor, to further cause the apparatus to:
determine a context label having a greatest probability for the determined location cluster;
compare the determined context label to a context label having a greatest probability for a second location cluster; and
merge the determined location cluster and the second location cluster in an instance in which the determined context label and the context label having the greatest probability for the second location cluster match.

14. The apparatus of claim 13, wherein the at least one memory and stored computer program code are configured, with the at least one processor, to further cause the apparatus to:
select a number of location clusters to be formed; and
form the selected number of location clusters.

15. A computer program product comprising at least one non-transitory computer-readable storage medium having computer-readable program instructions stored therein, the computer-readable program instructions comprising:
program instructions configured to determine a location identifier, the location identifier being indicative of a location of an apparatus;
program instructions configured to determine a location cluster based at least in part on the location identifier, wherein the determined location cluster comprises a location cluster determined from a set of at least one location cluster, and wherein each location cluster in the set of at least one location cluster comprises a cluster of one or more location identifiers grouped based at least in part on historically observed context data comprising a plurality of location identifiers augmented with context labels corresponding to observed contexts of the apparatus;
program instructions configured to determine a first probability for one or more contexts based at least in part on the determined location identifier, wherein the program instructions configured to determine the first probability comprise program instructions configured to determine the first probability for one or more contexts based at least in part on the determined location cluster; and program instructions configured to determine a context of the apparatus based at least in part on the determined first probability.

16. The computer program product of claim 15, further comprising:
program instructions configured to determine sensory data; and
program instructions configured to determine a second probability for one or more contexts based at least in part on the sensory data; and
wherein the program instructions configured to determine a context of the apparatus comprise program instructions configured to determine the context of the apparatus further based on the determined second probability.

* * * * *